(12) United States Patent
Agrawal et al.

(10) Patent No.: US 11,782,772 B1
(45) Date of Patent: Oct. 10, 2023

(54) SPECULATIVE SERVICE EXECUTION

(71) Applicant: International Business Machines Corporation, Armonk, NY (US)

(72) Inventors: Sugandha Agrawal, Stuttgart (DE); Timo Kussmaul, Boeblingen (DE); Harald Daur, Esslingen (DE); Torsten Teich, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/808,590

(22) Filed: Jun. 24, 2022

(51) Int. Cl.
G06F 9/44     (2018.01)
G06F 9/54     (2006.01)
G06N 7/01     (2023.01)

(52) U.S. Cl.
CPC .............. *G06F 9/542* (2013.01); *G06N 7/01* (2023.01)

(58) Field of Classification Search
CPC ........................................ G06F 9/542
USPC ........................................ 719/318
See application file for complete search history.

(56) References Cited

U.S. PATENT DOCUMENTS

| | | |
|---|---|---|
| 8,140,646 B2 | 3/2012 | Mickens |
| 9,483,407 B2 | 11/2016 | Sivasubramanian |
| 9,602,620 B1 | 3/2017 | Roskind |
| 2010/0274994 A1* | 10/2010 | Golla ................. G06F 9/30189 712/216 |
| 2018/0337972 A1 | 11/2018 | Lepeska |
| 2020/0409949 A1* | 12/2020 | Saxena ................... G06F 9/505 |
| 2021/0097186 A1* | 4/2021 | Mandal ................ G06F 21/552 |

OTHER PUBLICATIONS

Mell et al., "The NIST Definition of Cloud Computing", NIST National Institute of Standards and Technology U.S. Department of Commerce, Special Publication 800-145, Sep. 2011, 7 pages.

* cited by examiner

*Primary Examiner* — Timothy A Mudrick
(74) *Attorney, Agent, or Firm* — Stephen R. Yoder

(57) ABSTRACT

A computer-implemented method for execution of a service in a distributed environment, the method comprising performing a speculative execution of a service and storing a related result, wherein a decision whether the speculative execution of the service is performed is dependent on a dynamically changing score value and receiving a request for an execution of the service at a request proxy. Additionally, the method comprises upon determining that a valid result of the execution of the service is available from an earlier speculative execution of a comparable service, returning the valid result by the request proxy, and upon determining that a valid result of the execution of the service is not available from an earlier speculative execution of a comparable service, executing the service in a non-speculative manner, and returning a received non-speculative result by the request proxy.

20 Claims, 7 Drawing Sheets

SPECULATIVE SERVICE EXECUTION

BACKGROUND

The present invention relates generally to the field of services in a cloud computing environment, and more specifically, to execution of services in a distributed environment.

Cloud computing is one of the leading trends in the IT industry (information technology). Although for legacy monolithic applications in-house data center resources are used, enterprise IT leaders prefer more and more to offload componentized applications to remote service centers. Typically, these componentized applications are service based. Hence, a service-oriented architecture underlying pure cloud or hybrid cloud deployments is the way to go in the IT industry.

Microservices are an architectural and organizational approach to software development where software is composed of small independent services that communicate over well-defined application programming interfaces (APIs). Microservices architectures make applications easier to scale and faster to develop, enabling innovation and accelerating time-to-market for new features. A monolithic approach runs all components or processes are as a single service. Whereas, with microservices architecture, applications are built as various independent components that run as a process as a service in a distributed computing environment. Microservices communicate with one another and other programs via APIs. Because microservices are independent in operation and execution, each service can be updated, deployed, and scaled to meet demand for specific functions. The service-based or service-oriented cloud computing environment has already opened up new opportunities for enterprise IT centers including modernizing existing IT systems, getting rid of in-house archiving requirements, as well as addressing an in-house skill shortage, just to name a few.

Additionally, a service-oriented concept of implementing computerized applications also offers a plurality of additional advantages over in-house deployments. Flexibility is increasing and fixed cost assignments may be reduced, thereby converting them to continuous operational expenses instead of one-time capital expenditures. Furthermore, because of the typical statelessness of decoupled services developers allow longer be dependent on only one provider, but may mix and match services from different service providers. Moreover, the services which may provide now the functionality of traditional monolithic applications do not have to be executed in a serialized and fixed order. Instead, they may overlap in execution time and can also be executed on geographical distinct remote cloud computing data centers. This may represent a major advantage over classical deployments.

However, during certain times, specific services may be in high demand during some specific deployment time windows. This may prolong the execution of complete application functionalities because certain services involved in the application functionality can only be executed with a delay. Hence, there may be a demand for addressing this bottleneck in existing service-oriented architectures.

There are several disclosures related to a computer-implemented method for execution of a service in a distributed environment. It is known to reduce webpage load time including obtaining speculative information associated with the uniform resource locator (URL). It is also known to determine whether to pre-fetch content of the URL based on the speculative information. Additionally, it is known to utilize usage data to determine the dependency structure of a web application, including dependency structures between follow-on objects of an initial objects in a web transaction.

SUMMARY

According to one aspect of the present invention, a computer-implemented method for execution of a service in a distributed environment may be provided. The method may comprise performing a speculative execution of a service and storing a related result, wherein a decision whether the speculative execution of the service is performed is dependent on a dynamically changing score value, and receiving a request for an execution of the service at a request proxy. Moreover, the method comprises, upon determining that a valid result of the execution of the service is available from an earlier speculative execution of a comparable service, returning the valid result by the request proxy, and upon determining that a valid result of the execution of the service is not available from an earlier speculative execution of a comparable service, executing the service in a non-speculative manner and returning a received non-speculative result by the request proxy.

According to another aspect of the present invention, a system for speculative execution of a service in a distributed environment may be provided. The system may comprise a processor and a memory operatively coupled to the processor, wherein the memory stored program code portions, which, when executed enable the processor to perform a speculative execution of a service and storing a related result, wherein a decision whether the speculative execution of the service is performed is dependent on a dynamically changing score value, and to receive a request for an execution of the service at a request proxy.

Moreover, the system may comprise upon determining that a valid result of the execution of the service is available from an earlier speculative execution of a comparable service, return the valid result by the request proxy, and upon determining that a valid result of the execution of the service is not available from an earlier speculative execution of a comparable service, executing the service in a non-speculative manner, and returning a received non-speculative result by the request proxy.

In the following, further aspects of the present invention—applicable for the method as well as for the related system—will be described.

According to an aspect of the present invention, the dynamically changing score value may be determined by determining at least one selected out of the group comprising a risk factor value, a probability value of a performance gain, a performance gain percentage value and, a computational effort value required for the execution of the service. This computational effort may be assessed in light of a comparison to a regular execution of the service. The computational effort may also be transformed into a resource consumption; i.e., if a speculative effort may be possible, resources may be used that may, e.g., be underutilized at the time of the decision for the speculative execution. Hence, the proposed concept may comprise to use existing resources in a better and more productive way. Furthermore, the mentioned risk factor may comprise an assessment about an earlier successful speculative execution. It may also be added that the determination of the dynamically changing score value may also comprise a weighted combination of the above.

According to another aspect of the present invention, the method may also comprise executing the service in a speculative execution manner if the dynamically changing score value is larger than a configurable threshold value. The dynamically changing score value may typically be higher the more sense it may technically make to execute the speculative execution. The dynamic aspect of the score value may be reflected using service context and/or service content dependent on configurable threshold values.

According to another aspect of the present invention, the speculative execution of a service may be asynchronous to any non-speculative execution of the service. I.e., the speculative execution of the service may be performed at a time when no request for the execution has been received by the proxy server from another source. Hence, the speculative execution is not performed on demand of another requesting service but may be executed dependent upon the merits of the proxy server itself. It may be an execution of the service assuming that its results may be required soon.

According to another aspect of the present invention, the determination that a valid result of the execution of the service is available from an earlier speculative execution may use a service execution history, service context data—in particular, service request context data—of the earlier speculative execution of the service, service context data of the service requested for execution and/or a specification of service input data and service output data. Hence, all available information about the service and early executions of it as well as environmental data may be used for the decision about a speculative execution. This may be influenced by the dynamically changing score value. Furthermore, also other service metadata may be used to influence the score value and thus, the decision about a speculative execution.

According to yet another aspect of the present invention, the method may also comprise determining sequences of subsequent service executions from the service execution history, and increasing the dynamically changing score value for a second service if a probability of the second service being requested to be executed after an execution if a first service is larger than a predefined sequence threshold value, and if an execution of the first service has been requested. This feature may have a predictive character in the sense that a second service may be requested soon after a first service has been executed. Therefore, a form of parallelism of service executions may be created so that the second service may be started although the first service has not yet finished its execution. Hence, the execution times may overlap and the result of the second service may be available immediately after or even before an execution time of the first service may have ended. This may increase the total execution time significantly.

According to still yet another aspect of the present invention, the result of the speculative execution of the service may be invalidated after a service-specific time period. This way, it may be avoided that invalid results may be used because of the speculative character of a service execution.

According to even yet another aspect of the present invention, the method may also comprise maintaining a speculative execution flag starting with a registration of a service with the request proxy, wherein the speculative execution flag may be indicative of an ability of the service to be executed in a speculative manner. Further metadata may be required for this like a set of input variable and a set of output variable definitions required by the service. I.e., the complete framework of environmental data for the service to be executed should be available and known.

According to a further aspect of the present invention, the method may also comprise determining a load metric value—or a plurality thereof—of a host system executing services registered at the request proxy, and dynamically adapting the dynamically changing score value dependent on the determined load metric value. Thus, if the available server for execution may be overloaded, a speculative execution of the service may become less probable.

According to another further aspect of the present invention, the method may further comprise determining a first average execution time for all state providers related to an execution of a first service, determining a second average execution time for those state providers which are enabled for a speculative execution and which are related to an execution of the first service, and determining a ratio—in particular as a metric value—between the first and the second average execution time, and using the ratio for adapting the dynamically changing score value. The enablement for the speculative execution may be indicated by an associated indicator flag for an easy decision about the speculative execution. The enablement for the speculative execution may be indicated by an indicator flag associated with a state provider for an easy decision about the speculative execution. The flag, for example, may be included in state provider metadata maintained in a state provider registry.

Furthermore, embodiments of the present invention may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

There is a need to make service-oriented application implementations more flexible in terms of using services of an application. The proposed computer-implemented method for execution of a service in a distributed environment may offer multiple advantages, technical effects, contributions and/or improvements:

Embodiments of the present invention may extend the existing service-oriented architecture implementation of applications so that services do not have to be executed when a result of them is required. Instead, the service may be executed asynchronously to a specific demand. Although stateless services are executed asynchronously by design, the proposed concept may go beyond this basic concept of service orientation. This is because a service does not have to be executed at the moment of the requirement for the result, but may be pre-executed depending on a probability that the result may be required soon. This probability or predicted demand for the results of the service may be expressed by a dynamically changing score value. The score value may be service specific.

Additionally, a related proxy server may control whether a specific service may be allowed to be executed speculatively. This concept may allow to pre-execute specific services for which a request for execution may be expected soon. Only the results of the specific service, which may be intermediate, is stored, may be returned to a calling service. Hence, the available resources can be used in a much more dynamic and balanced way and, execution of certain services, which may be in high demand during certain service times, can be shifted to times with less demand for the service. The response times of services may be reduced significantly and the network traffic may be balanced much better.

Aspects of the present invention may also be combined with state injection concepts for services by which the statelessness of services may partially be overcome. Therefore, the concept proposed here and the injection concept may not be an either/or decision, but may support each other in a natural way. Additionally, the concept proposed here may be introduced in a stepwise process also in complex service-oriented deployments because the "out-of-order" execution of a service can be implemented step-by-step, starting with only one service that may be enabled for a speculative execution. A request proxy may set a flag during the registration of a service indicating that the newly registered service may be enabled for a speculative execution. Thereby, more and more services with this flag can in a step-by-step manner replace existing services.

Some embodiments of the present invention go far beyond web content preload in a browser. Loading content provisionally is a much simpler concept if compared to service execution in a service-oriented computing environment because it is addressing the backend computation and server infrastructure instead of a pure client browser concept. Displaying content and executing program code on a server system is not to be interchanged.

It should be noted that embodiments of the present invention are described with reference to different subject-matters. In particular, some embodiments of the present invention are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject—matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the present invention is not limited.

Figure 1:
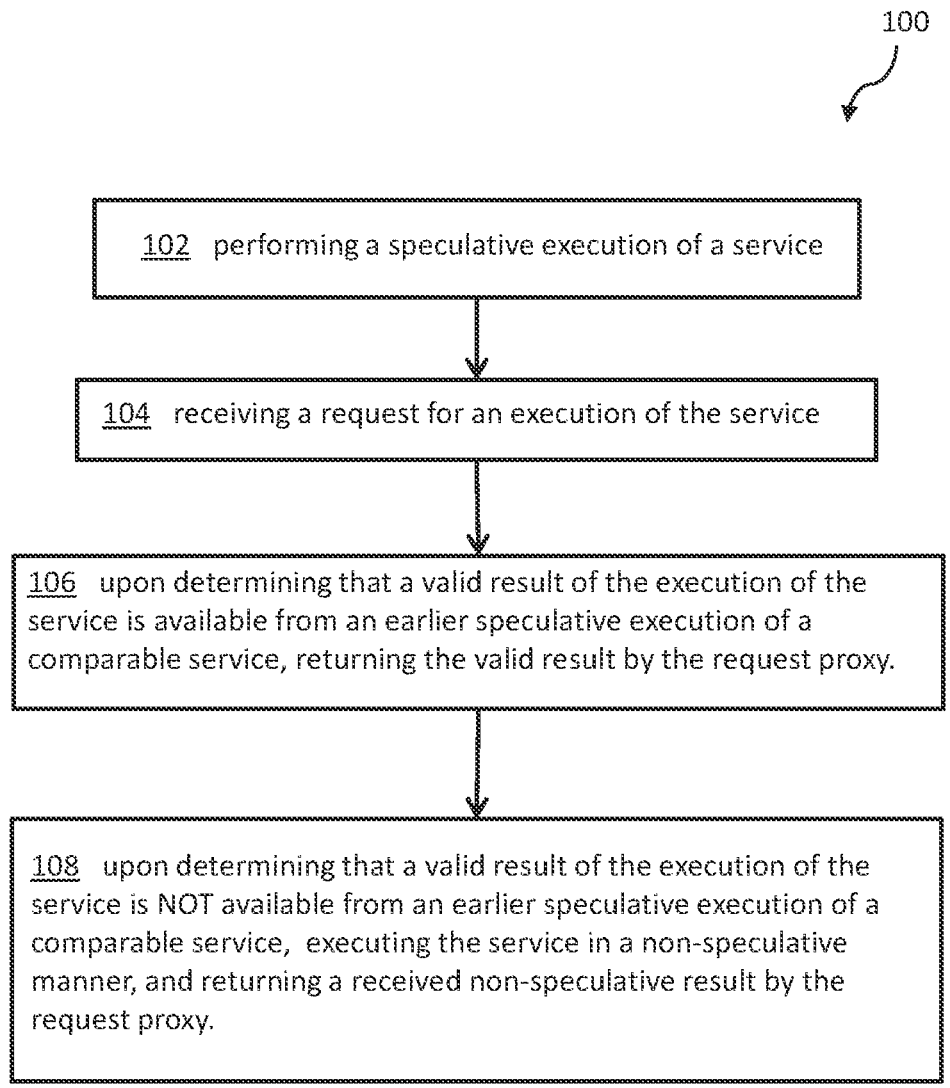
Figure 2:
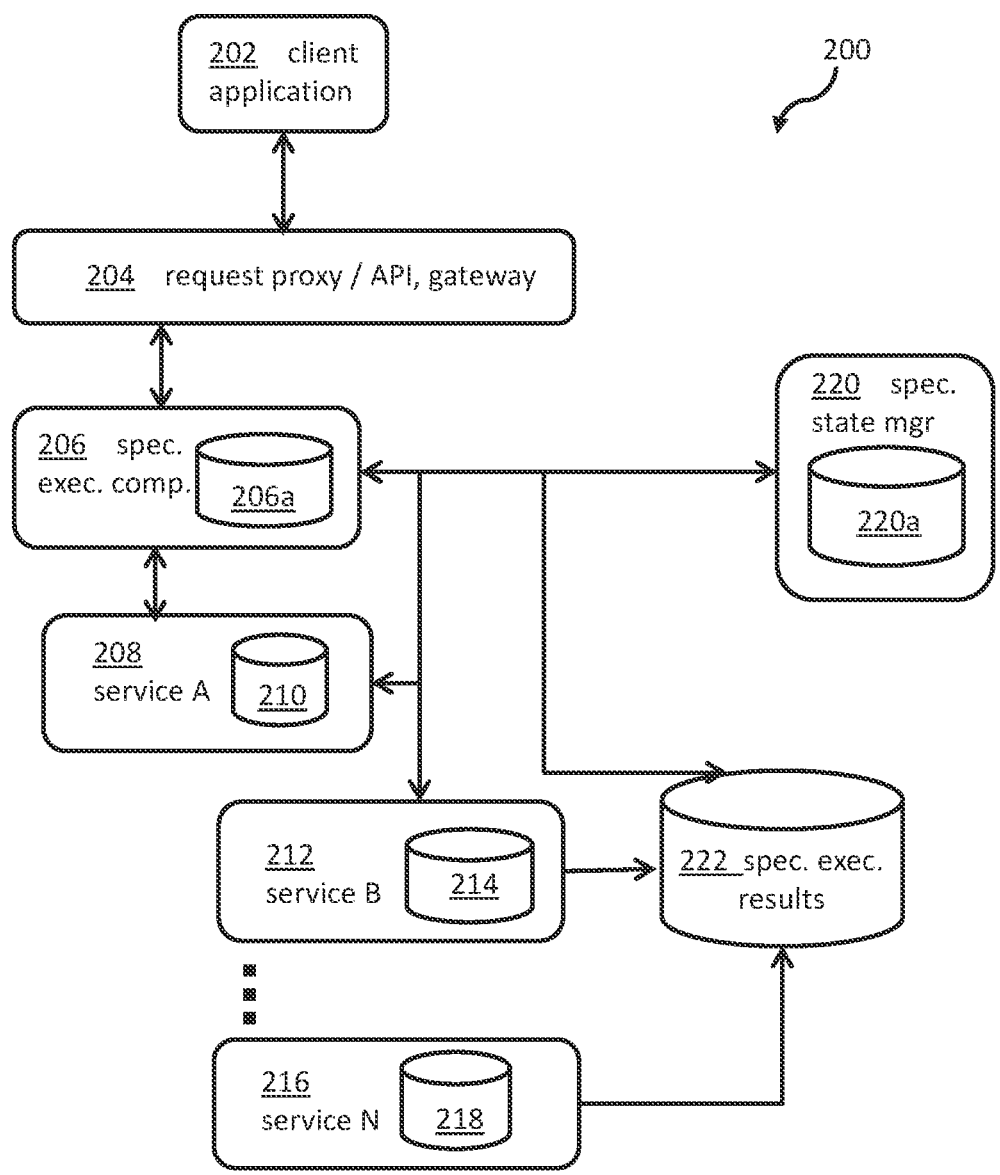
Figure 3:
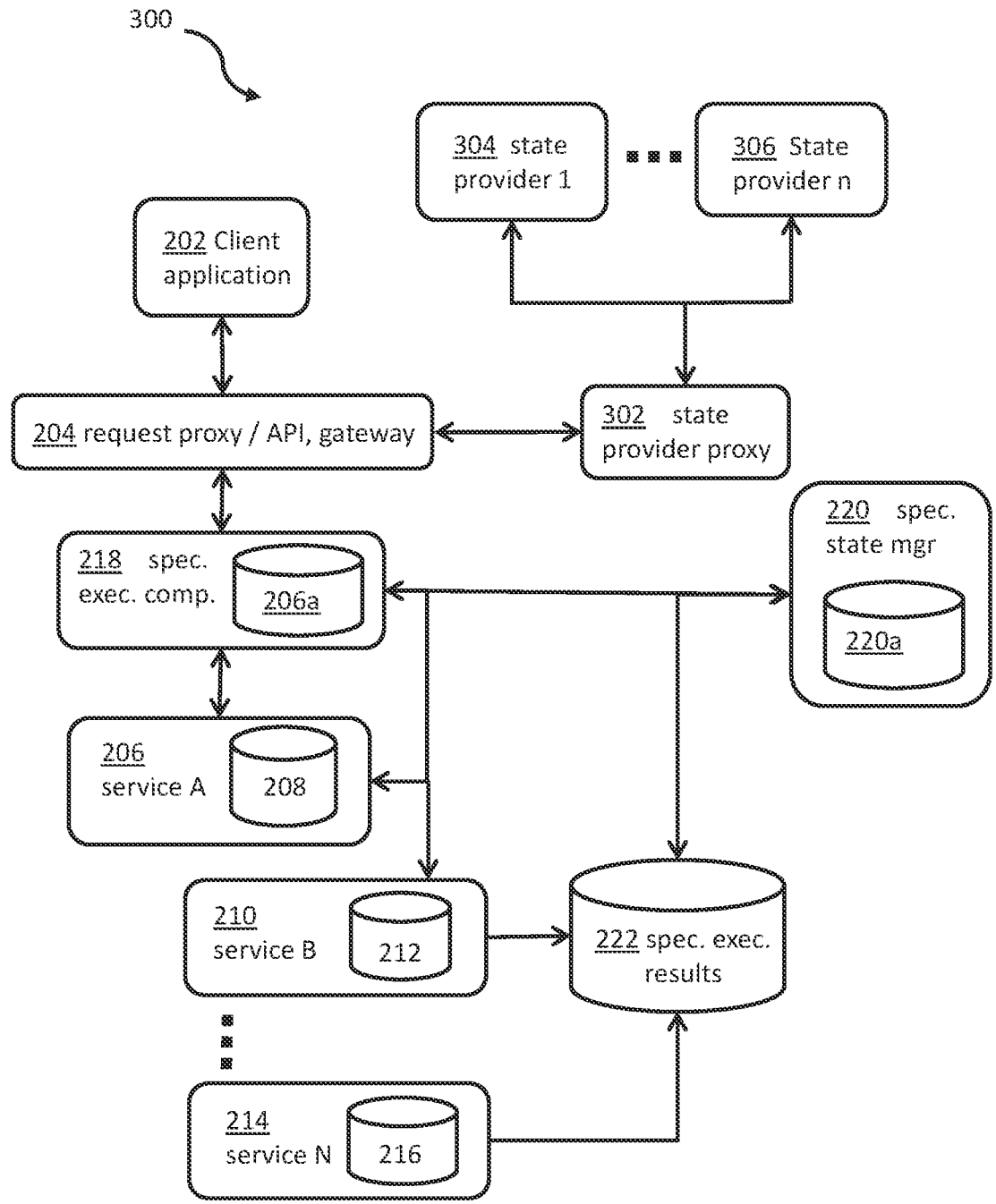
Figure 4:
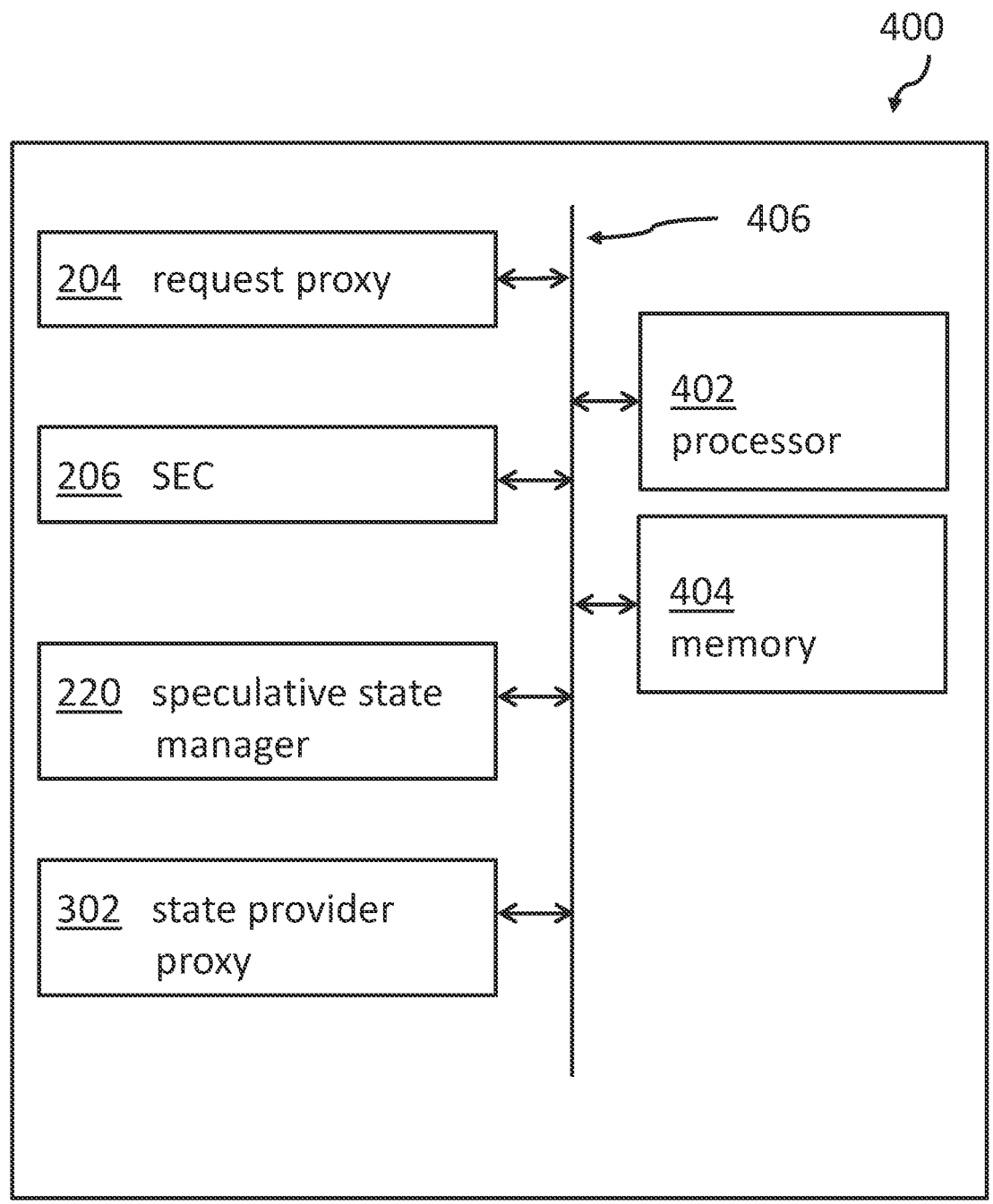
Figure 5:
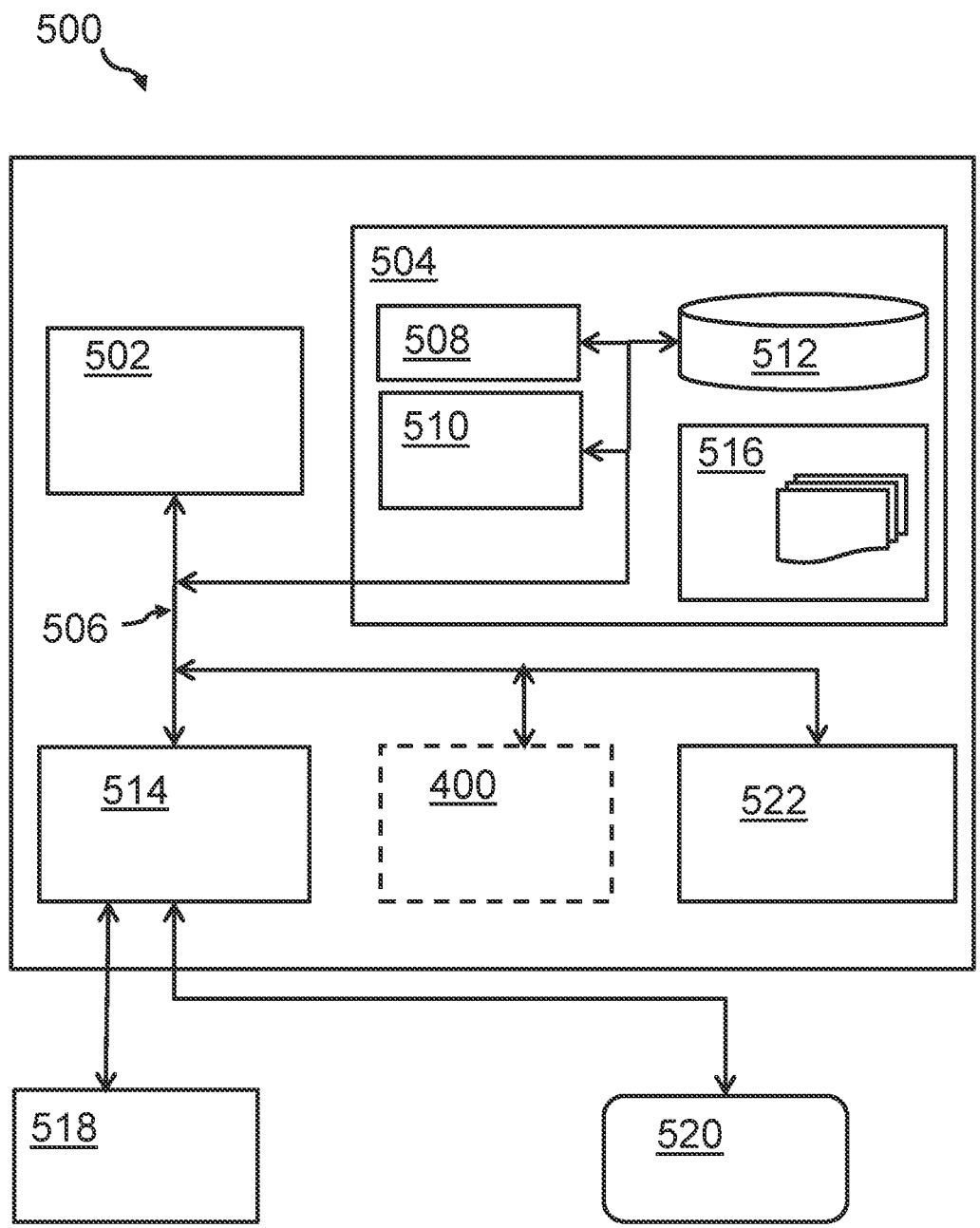
Figure 6:
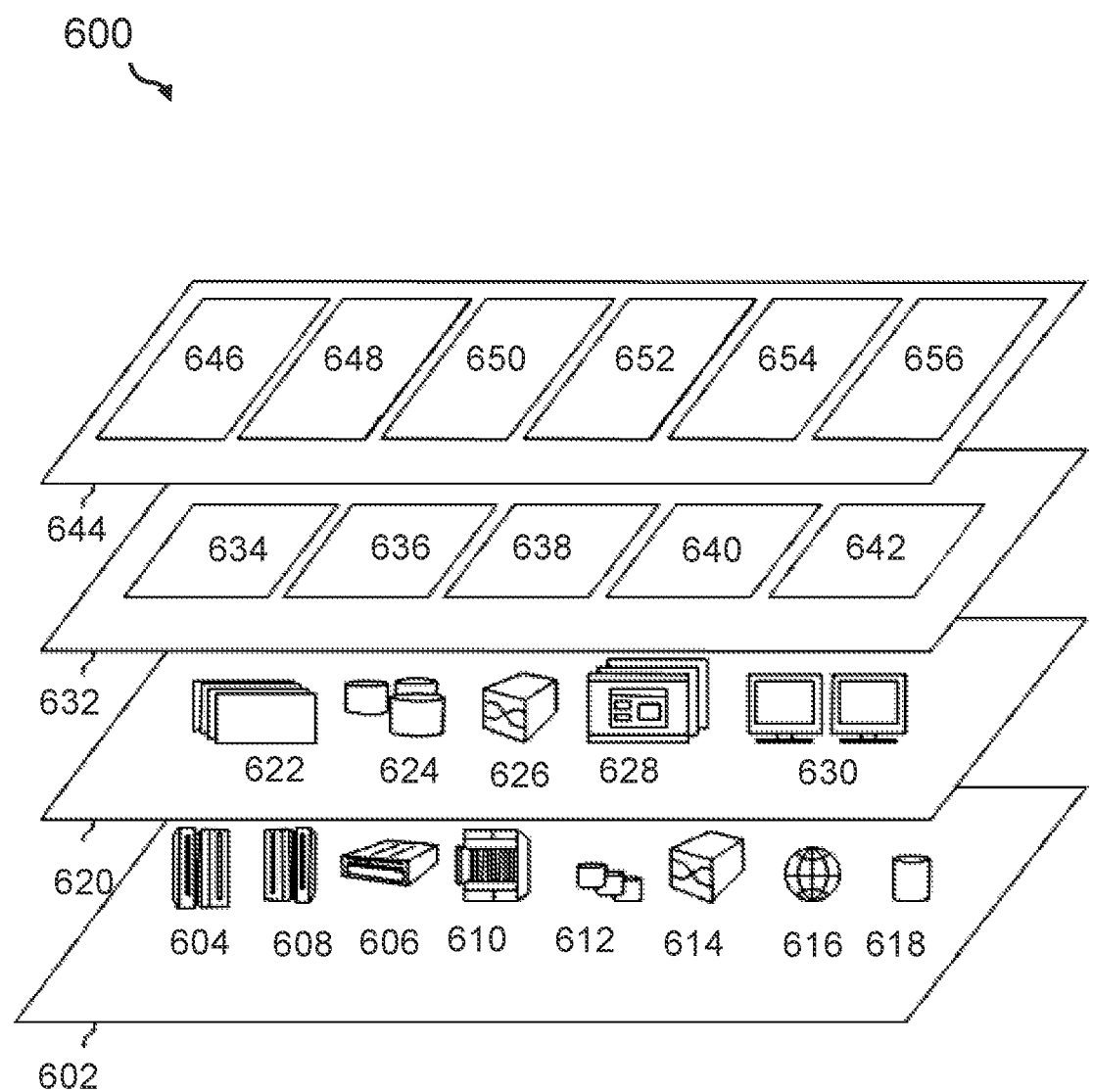
Figure 7:
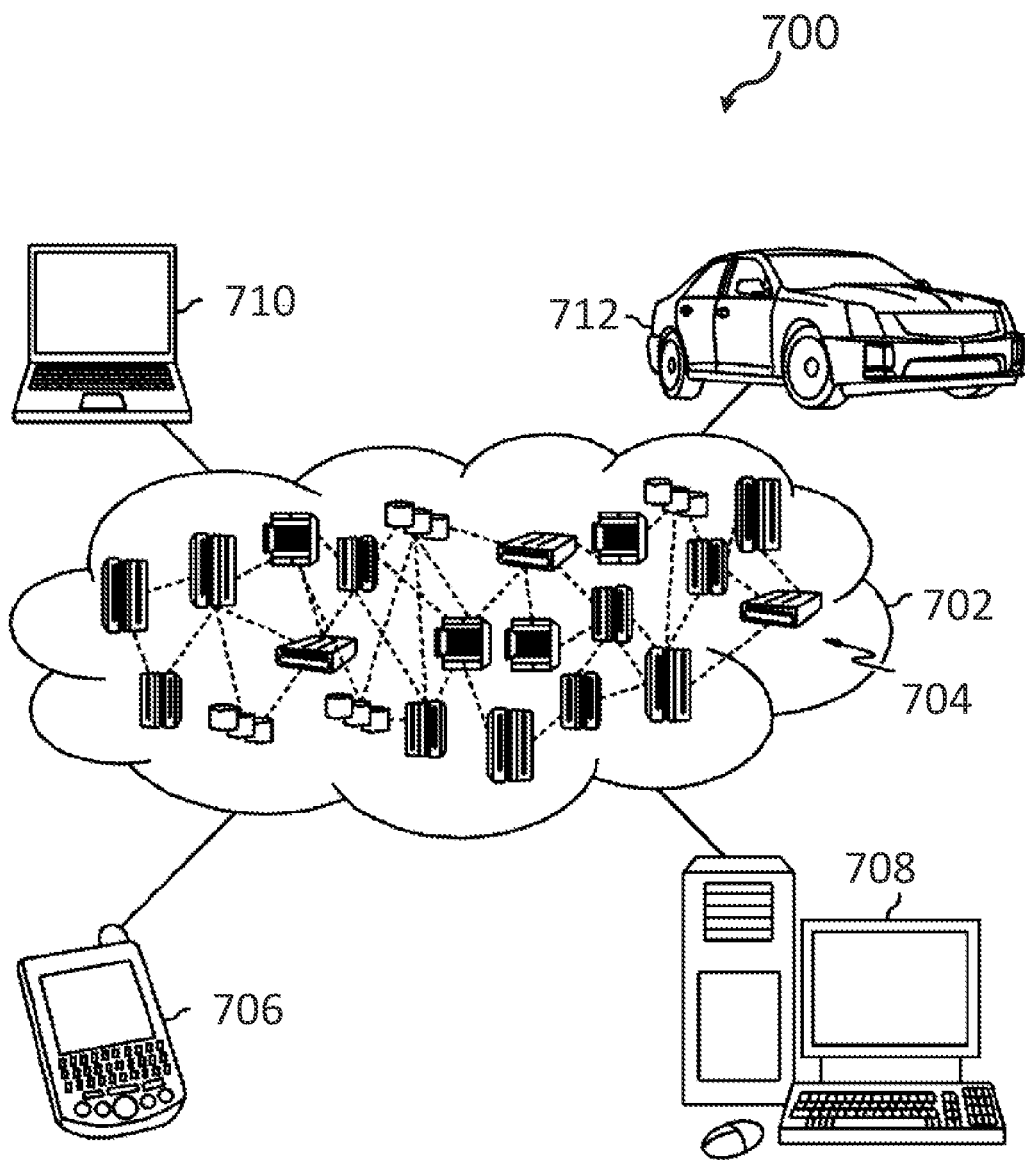

FIG. 1 is a flowchart showing a computer-implemented method for execution of a service in a distributed environment according to embodiments of the present invention;

FIG. 2 is a schematic view of a first system for speculative service execution according to embodiments of the present invention;

FIG. 3 is a schematic view of a second system for speculative service execution according to embodiments of the present invention;

FIG. 4 is a block diagram of a system for speculative execution of a service in a distributed environment according to embodiments of the present invention;

FIG. 5 is block diagram of a computing system including the system for speculative execution of a service of FIG. 4;

FIG. 6 depicts abstraction model layers according to an embodiment of the present invention; and FIG. 7 depicts a cloud computing environment according to an embodiment of the present invention.

DETAILED DESCRIPTION

In the context of this description, the following technical conventions, terms, and/or expressions may be used:

Service: in particular, in the sense of a service-oriented architecture—may denote an executable code portion adapted to perform a self-maintained and mostly autonomous function which can be executed in a cloud computing environment. The service may typically be compliant with a set of standards, e.g. according to W3C, i.e., Web services. Multiple networking and messaging protocols may be used for a communication to and from a service.

Distributed environment: may denote a technical computing infrastructure which may be logically and geographically distributed. Services being executed in the distributed environment may be centrally controlled but executed on different nodes of the distributed computing environment. Hence, one service may be executed on one node in location A and another service may be executed on the node and location B. However, both services may be components of a larger application. A central control and orchestration service manages interactions of the services for a joint result. Additionally, equal services may be executable in different geographically distributed compute centers.

Speculative execution: may denote that a service in the above sense is not only executed when its execution is requested but also asynchronously to execution requests and independent of any direct request. As a consequence, the results of speculative execution may serve as inventory for future use.

Dynamically changing score value: may denote a numerical value indicative of a potential need for results of a related service. The score value may be executed without any specific external request to deliver and store results of the service and an inventory. These results may then be used by a calling service without the need to execute the service which results are requested because the results "on stock" may be used instead. The score value may also be influenced by many other parameter values, like available computing resources and similar.

Request proxy: may denote an instance receiving requests for service execution from a requesting service and activating the requested service in a distributed computing environment. In this sense, the request proxy may act as a sort of store-and-forward instance for the requested service. However, the request proxy may also fulfill a series of the tasks like load-balancing, service orchestration and others and may be integrated with respective components of the cloud infrastructure, e.g., like an API gateway. Hence, the role and/or general functionality of the request proxy may also be performed by other physical or logical unit like units, like the mentioned API gateway.

Cloud computing: and equivalently the more specific term "cloud computing environment"—may in this context be interpreted as a model for enabling convenient, on-demand network access to a shared pool of configurable computing resources (e.g., networks, servers, storage, applications, and services, i.e., collectively denoting execution environments) that can be rapidly provisioned and released with minimal management effort or service provider interaction. This cloud model promotes availability and is composed of at least five essential characteristics, three service models and four deployment models.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.It may be noted that cloud software can take full advantage of the cloud paradigm by being service-oriented with a focus on statelessness (with exceptions), low coupling, modularity, and semantic interoperability.

In the following, a detailed description of the figures will be given. All instructions in the figures are schematic. Firstly, a block diagram of an embodiment of the inventive computer-implemented method for execution of a service in a distributed environment is given. Afterwards, further embodiments, as well as embodiments of the system for speculative execution of a service in a distributed environment will be described.

FIG. 1 shows a block diagram of a preferred embodiment of the computer-implemented method 100 for execution of a service in a distributed environment. That distributed environment can be any distributed computing infrastructure like an infrastructure based on the concept of a service-oriented architecture, a cloud computing environment, and infrastructure supporting microservices, but also the more classical concepts like client/server computing.

The method 100 comprises performing, 102 a speculative execution of a service and storing a related result, wherein a decision whether the speculative execution of the service is performed is dependent on a dynamically changing score value. In the described distributed environment typically a plurality of services may underlie the concept of speculative execution. However, it is not required that each available service and each available node of the execution environment needs the support of the speculative execution concept. Configuration parameters can allow a fine-grained selection of services and infrastructure components for the support of the here newly described concept. The storing of the related result may be controlled by a speculative execution component, potentially together with a speculative state manager. These additional components may be integrated or work in cooperation with a request proxy for services and the like.

The method 100 comprises additionally receiving, 104, a request for an execution of the service at the request proxy. Upon determining, 106, that a valid result of the execution of the service is available from an earlier speculative execution of a comparable—i.e., identical, similar or compatible—service, the method 100 ensures a returning the valid result by the request proxy, in particular to the requesting service. For this, it should be ensured that the result of the earlier speculative execution is not timed-out.

Furthermore, the method 100 comprises upon determining, 108, that a valid result of the execution of the service is not available from an earlier speculative execution of a comparable service, (i) executing the service in a non-speculative manner, and (ii) returning a received non-speculative result by the request proxy.

Before describing the additional figures, a more conceptual but implementation-near overview of the proposed concept should be given:

The service-based cloud environment is hereby extended by a new service execution component (SEC). Each service request (for invoking a service in the cloud environment) is sent to the SEC by an API (application programming interface) gateway component. The SEC may be implemented as a standalone component or as a sub-component of the API gateway responsible request proxy or another component. In one embodiment, the inventive concept can be combined with a state infusion technology by which technical stateless services can be infused with a predefined state at the start of the execution. However, it is not required that this additional concept is also implemented. The concept proposed here may also be implemented independently of a state infusion mechanism.

The SEC comprises or interacts with a monitoring component to maintain information about current and previous sequences of service requests, e.g., performance data of the service execution.

The SEC can use this information to invoke services automatically and speculatively in anticipation of future needs, independent of a current client request. In other words, it speculatively invokes services before receiving a corresponding service invocation request from a client application for another requesting service. It sends the results of these service invocations to a speculative state manager, which stores or caches the results in a dedicated persistent storage. A service result comprises the service response (which is to be returned to a client service) and a set of state changes (which are to be persisted in a production data storage).

When a corresponding service request is later received, the SEC can provide the service results from the speculative state manager (SSM), and does not have to invoke the service itself, which significantly improvise the response time.

A request processing flow of the SEC can be described as follows: Firstly, services are registered with the SEC through a registration API or gateway. In a preferred embodiment, the API or gateway invokes this registration API.

During runtime, the API gateway can invoke the SEC for processing a service request. For that, (i) the SEC determines the service request context (e.g., comprising request parameters, request endpoint, URLs [i.e., universal resource locator], request headers), and invokes the speculative state manager, passing the service context. The speculative state manager checks its database for a (potentially speculatively created) service result matching the received service context.

Then, (ii) if such a result from a former execution is available, it is returned to the SEC. The SEC then—instead of invoking the requested service—returns the service result to the API gateway. In addition, the speculative state manager performs a commit functionality to move all state changes that are part of the service result to persistent production storage (e.g., the production database).

Next, (iii) if such a result is not available, the speculative state manager returns, and the SEC will use the prior art mechanisms to invoke the service and then process the service results back according to prior art.

Last but not least, (iv) the SEC logs all service requests including service request context details. The log can be analyzed in a later or a parallel step, and the log analysis allows to, e.g., correlate multiple service requests related to the same client request (e.g., in a flow, where one service invokes another service via the API gateway and in turn the SEC).

A speculative execution flow of the SEC can be described as follows: In parallel to the request flow processing, the SEC runs the speculative execution flow to determine (and to execute) a set of speculative execution service candidates (i.e., a set of services). The SEC selects a service for speculative service execution if it is confident—i.e., the score value is above a predefined threshold—that the speculative execution of this service would provide a significant performance gain during future operation.

To do so, the SEC determines at least one speculative execution context for all or some of the service it manages. In the preferred embodiment, the SEC determines one speculative execution context for each combination of (current or expected) client requests and services, i.e., a speculative execution context can be client request- and service-specific.

Firstly, the SEC determines service metadata which is either provided to the SEC during service registration or is determined by the SEC from a service registry component. The metadata can be created manually by an administrator or can be created automatically during, e.g., a build process, or a code analysis process of the service implementation. This service metadata can contain at least one speculative execution flag. The SEC checks this speculative execution flag: If this flag indicates the service cannot be executed speculatively, the context is marked non-speculatively executable and its speculative execution score is set=0; also further speculative execution context calculation for this service can be stopped.

In a preferred embodiment based on a state infusion technique, the SEC queries a prior art state provider registry for the set of the input variable definitions and the set of output variable definitions as well as, a list of the matching state providers for the service. It then determines—either from the state provider metadata that is returned by the state provider registry or by invoking a defined API of the state provider—if the state providers support speculative (SE) execution. The SEC will remove any non-SE supporting state provider from the list of state providers, and it will stop further SE context determination if there is not at least one service provider remaining per input variable definition and output variable definition.

In this SE mode, a state provider registry can select state providers that are enabled for speculative execution and for interacting with the speculative state manager. These state providers will, e.g., not commit persistent state changes immediately, but can delegate handling of persistent state changes to the speculative state manager.

The SEC can also analyze the SEC log and the state log (in the preferred embodiment, the state log is maintained by the state provider registry and the state providers). The logs are parsed to create a model representing (a sample of) previous request flows; i.e., modelling, e.g., the service request flows through the SEC for the last x days. Thereby, each service request is correlated to a client request; a client request similarity can be quantified using various similarity measures, e.g., client requests are considered similar if they are submitted by the same client or user or tenant, etc.

The SEC (or SEC request flow analysis subcomponent responsible for this) can then analyze this model to determine various metrics—i.e., respective value—for a given SE context (i.e., for a specific service and client request). The following metrics can be considered:

The probability the service was executed during a set of previous similar client requests delivers a factor P. Here, the SEC determines the set of similar client requests by using said similarity measure and determines the factor from the sub-model related to the similar client requests.

The average response time of the service (depending on the embodiment; this calculation can be based on the entire model or be limited to the sub-model related to similar client requests) delivers a factor TS.

An average execution time of the overall client request (i.e., E0) and the part of the client request that executes after completion of the service, i.e., E1, can also be used.

A novel potential state provider overhead metric can achieve the following: The SEC determines the average execution efforts (e.g., time values) for the (SE enabled and non-SE enabled) state providers related to the previous invocations of this service. It determines this metric from the model and the state logs. This delivers factor SPT.

The average execution costs for the previously determined set of (only) SE-eligible state providers are then determined. This delivers the factor SPT2. Then the difference is determined to quantify the potential state provider SE overhead related to this service. This results in the following factor:

$SP0 = SPT2 - SPT.$

At least one metric is determined that quantifies the relative load on the host systems which will potentially process the service and the service providers: this is aggregated into factor L.

The SEC determines then the set of potential hosts for service execution and service provider execution (e.g., by querying a service registry and the state provider registry) and queries a prior art performance analysis system for current and average metrics related of these host systems. It determines a relative load metric value for each host based on the current load of these systems and the average load. It then calculates an overall relative load metric value from the weighted average of the potential service execution hosts and the potential service provider hosts, weighed according to the previous execution costs ratio between the service execution and the service provider execution.

This is done to avoid creating additional SE load on an already overloaded system. These factors are aggregated into one score:

$$\text{score} = f(P, TS, E0, E1, SPO), \text{ e.g.,}$$

$$\text{score} = \frac{(P*(E1-TS) - SPO - (1-P)*TS)}{E0}.$$

The SEC selects the set of services to be speculatively executed based on their score, e.g., it selects all services having a score larger than a threshold value, where:
L:threshold=g(L), e.g.,
if: L>1.25: threshold=∞, else if L>1: threshold=0.6, else: threshold=0.3

The SEC interacts with the state provider registry to enable the SE mode for the state providers corresponding to the pending speculative service executions. It invokes a SPR API passing the identified ones of the selected services as well as a subset of the SE context. It also passes a timeout value, in particular to a maximum validity time of the speculative results.

Then, the SEC invokes the selected services using prior art means. During service execution, the SE enabled service providers will ensure the service response and state updates are managed by the speculative state manager. The request processing flow will automatically pick up the results of the speculative execution, as described before. In case the speculatively executed services will not be requested during the normal request processing flow, the speculative state manager will expire the stored service response and state changes after the timeout.

FIG. 2 shows a block diagram 200 of a practical preferred embodiment for speculative service execution. As described above, the request proxy, API or gateway 204 plays a central role in the concept proposed here. It receives a request for a service execution from the client application or requesting service 202. In traditional environments, it coordinates and requests the execution of, services A 208 from a component/ node of the distributed environment depending on its availability and serviceability. Each of the services A 208, B 212, N 216 may have its own state management library 210, 214, 218. Also in traditional environments, the services deliver the result back to the request proxy 204 which, in turn, returns the result to the calling client application 202 or related requesting service.

The new components of the concept proposed here are shown in more bold lines. This concerns the speculative execution component 206 with its related storage 206a for history data, log data and metric data, the speculative state manager 220 with a related storage for state logs, as well as the storage 222 for speculative execution results. At least some of the communication paths between the existing and new components are shown. E.g., the speculative execution component 206 may initiate the execution of service A 208 even when not any client application 202 has requested actual execution. The speculative execution of, e.g., service A 208 is dependent on the dynamically changing or adjustable score value, as explained above. The same applies to any other service B 212, N 216.

In case of a speculative execution, the related service 208, 212, 216 would store its result in the storage 222 for speculative execution results under the control of the speculative execution component 206 and the speculative state manager 220. In case a client application 202 or requesting service would request a service of which the speculative execution component 206/speculative state manager 220 can determine that a valid result is stored in the storage 222 for speculative execution results, the speculative execution component 206 would return the requested result to the request proxy 204 which, in turn, would return the result to the requesting application 202. An actual execution of a service returning the results would not be required. This can enhance the overall system performance significantly. Additionally, idle times of infrastructure components can be used in a much more productive way.

FIG. 3 shows a block diagram of an alternative practical preferred embodiment 300 for speculative service execution. In addition to the components of FIG. 2 all having the same reference numerals, additional components are also shown that allow state infusion into existing services 206, 210, 214 when loaded for execution. It should be noted that in this figure not all direct and logical communication lines are shown in order to increase comprehensibility. However, this additional aspect can enable that the nominally stateless services 206, 210, 214 can start with a predefined status controlled by the state provider proxy 302 which is in direct communication with the request proxy 204. The state provider proxy 302 is also connected to related state providers, e.g., state provider 1 304 . . . state provider n 306. Here, predefined status variables may be stored in order to start one of the services 206, 210, 214 with a predefined status.

Hence, the concept of speculative service execution may be implemented in traditional distributed environments for service execution, but also in environments allowing a state infusion technique at the start of a service execution. In combination, these two concepts increase capabilities of distributed service execution significantly.

FIG. 4 shows a block diagram of an embodiment of the system 400 for speculative execution of a service in a distributed environment. The system comprises a processor 402 and a memory 404 operatively coupled to the processor 402, wherein the memory 400 for stored program code portions, that, when executed enable the processor 402 to perform a speculative execution of a service—in particular, by a speculative execution component 206—and storing an associated result—in particular, in a speculative execution results storage 222. Thereby, a decision whether the speculative execution of the service is performed is dependent on a dynamically changing score value.

The processor 402 of the system 400 is further enabled to receive—in particular, by a request proxy 204—a request for an execution of the service at a request proxy, in particular, from a client application 202 or related service.

Then, the processor is upon determines—in particular, using the SEC 206 as well as the speculative state manager 220 with the related storage systems 206a, 220a— that a valid result of the execution of the service is available from an earlier speculative execution of a comparable service also enables a return of the valid result by the request proxy—in particular by the request proxy 204, and upon determination that a valid result of the execution of the service is not available from an earlier speculative execution of a comparable service, execute—in particular using the speculative execution component 206—of the service in a non-speculative manner, and returning a received non-speculative result by the request proxy, in particular using the request proxy 204.

It shall also be noted that the speculative execution component 206 and the speculative state manager are at least partially comprised within request proxy 204, along with history data, log data and metrics data and the storage 220a for state logs.

If the state infusion concept is also implemented in the novel concept, components of the state provider proxy 302 and related components may also be part of the system 400.

It shall also be mentioned that all functional units, modules and functional blocks—in particular, the processor 402, the memory 404, the request proxy 204, the speculative execution component 206, the speculative state manager 220 and optionally the state provider proxy with related components 302—may be communicatively coupled to each other for signal or message exchange in a selected 1:1 manner. Alternatively, the functional units, modules and functional blocks can be linked to a system internal bus system 406 for a selective signal or message exchange.

Some embodiments of the present invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system and is not intended to suggest any limitation as to the scope of use or functionality of some embodiments of the present invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of some embodiments of the present invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of some embodiments of the present invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the system 300 for speculative execution of a service in a distributed environment may be attached to the bus system 406.

FIG. 6 shows a cloud computing environment 600 in which at least parts of the inventive concept may be deployed. A set of functional abstraction layers provided by a cloud computing environment is shown. It should be understood in advance that the components, layers, and functions, shown in FIG. 6, are intended to be illustrative only, and some embodiments of the present invention are not limited thereto. As depicted, the following layers and corresponding functions are provided: Hardware and software layer 602 include hardware and software components. Examples of hardware components include: mainframes 604; servers 606; RISC (Reduced Instruction Set Computer) architecture based servers 608; blade servers 610; storage devices 612; networks 614 and networking components 614. In some embodiments, software components include network application server software 616 and/or database software 618.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630. In one example, management layer 632 may provide the functions described below. Resource provisioning 634 provides dynamic procurement of computing resources and other resources that are utilized to perform tasks within the cloud computing environment. Metering and pricing 636 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 638 provides access to the cloud computing environment for consumers and system administrators. Service level management 640 provides cloud computing resource allocation and management such that required service levels are met. Service Level Agreement (SLA) planning and fulfilment 642 provides pre-arrangement for, and procurement of, cloud computing resources for which a future requirement is anticipated in accordance with an SLA.

Workload layer 644 provides examples of functionality for which the cloud computing environment may be utilized. Examples of workloads and functions which may be provided from this layer include: mapping and navigation 646; software development and lifecycle management 648; virtual classroom education delivery 650; data analytics processing 652; transaction processing 654; and the system 656 for speculative service execution (compare also FIG. 4, 400).

FIG. 7 shows components 700 of a cloud computing environment 702. As shown, cloud computing environment 702 comprises one or more cloud computing nodes 704 with which local computing devices used by cloud consumers, such as, for example, personal digital assistant (PDA) or cellular telephone 706, desktop computer 708, laptop computer 710, and/or automobile computer system 712 may communicate. Nodes 704 may communicate with one another. They may be grouped (not shown) physically or virtually, in one or more networks, such as Private, Community, Public, or Hybrid clouds as described hereinabove, or a combination thereof. This allows cloud computing environment 702 to offer infrastructure, platforms and/or software as services for which a cloud consumer does not need to maintain resources on a local computing device. It is understood that the types of computing devices 704 shown in FIG. 7 are intended to be illustrative only and that computing nodes 604 and cloud computing environment 702 can communicate with any type of computerized device over any type of network and/or network addressable connection (e.g., using a Web browser).

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium(or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read—only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD—ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider),In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to some embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the present invention in the form disclosed. Many modifications and variations will be apparent to those of ordinary skills in the art without departing from the scope and spirit of the present invention. The embodiments are chosen and described in order to best explain the principles of the present invention and the practical application, and to enable others of ordinary skills in the art to understand the present invention for various embodiments with various modifications, as are suited to the particular use contemplated.

Some embodiments of the present invention are directed to a method for execution of a service in a cloud environment, comprising the steps: maintaining a service request history; creating a graph like service request model based on the service request history, comprising a set of previously requested services; each service is associated with a service request context and is associated with the set of services it issued requests to; selecting a first service from a set of registered services; determining the service request context for the selected service; processing the model to calculate a set of metrics, comprising: a) selecting a set of similar service requests contained in the model based on a service request context similarity measure, b) creating a submodel including at least the selected set of service requests, and c) calculating a set of metrics by analyzing the submodel; calculating a score based on set of metrics; determining a threshold value based on the load on a set of host systems; comparing the score to the threshold value and invoking the first service if the score exceeds the threshold value.

Some embodiments of the present invention are directed to processing a model to calculate a set of metrics by: (i) analyzing the submodel and calculating a metric representing a ratio between the request flows contained in the submodel and including the selected service, and the request flows contained in the submodel and not including the selected service; (ii) analyzing the submodel and calculating a metric representing the average response time of the selected service in the request flows contained in the submodel; and (iii) analyzing the submodel and calculating a set of client requests and a execution time for each client request.

Some embodiments of the present invention are directed to determining a service request context for a selected service by: (i) determining service metadata, comprising: a) a set of input variable definitions and output variable definitions that are required by the service; and b) an indicator flag ("speculative execution flag"); (ii) determining a set of state providers for each of said input variable definitions and output variable definitions; (iii) determining an indicator for each of said state providers; (iv) determining a second set of state providers for each of said input variable definitions and output variable definitions depending on the state provider specific indicators.

Some embodiments of the present invention are directed to processing a model to calculate a set of metrics, by calculating a state provider related metric including: (i) calculating the average execution times for all state providers related to the execution of the first service in the submodel; (ii) calculating the average execution times for those state providers whose associated indicator flag is true and which are related to the execution of the first service in the submodel; (iii) calculating a metric measuring the ratio between both the execution times.

Some embodiments of the present invention may now be summarized by the following clauses:

The computer-implemented method of clause 1 for execution of a service in a distributed environment comprises:
  performing a speculative execution of a service and storing a related result, wherein a decision whether the speculative execution of the service is performed is dependent on a dynamically changing score value,
  receiving a request for an execution of the service at a request proxy,
  upon determining that a valid result of the execution of the service is available from an earlier speculative execution of a comparable service,
    returning the valid result by the request proxy, and
  upon determining that a valid result of the execution of the service is not available from an earlier speculative execution of a comparable service,
    executing the service in a non-speculative manner, and
    returning a received non-speculative result by the request proxy.

The method of clause 2 is performed according to clause 1 and wherein the dynamically changing score value is determined by:
  determining at least selected out of the group comprising a risk factor value, a probability value of a performance gain, a performance gain percentage value and, a computational effort value required for the execution of the service.

The method of clause 3 is performed according to clause 1 or 2 and comprises:
  executing the service in a speculative execution manner if the dynamically changing score value is larger than a configurable threshold value.

The method of clause 4 is performed according to any of the preceding clauses 1, 2, and 3, wherein the speculative execution of a service is asynchronous to any non-speculative execution of the service.

The method of clause 5 is performed according any of the preceding clauses 1, 2, 3, and 4, wherein the determination that a valid result of the execution of the service is available from an earlier speculative execution is using a service execution history, service context data of the earlier speculative execution of the service, service context data of the service requested for execution and/or a specification of service input data and service output data.

The method of clause 6 is performed according to clause 5 and comprises:
- determining sequences of subsequent service executions from the service execution history, and
- increasing the dynamically changing score value for a second service if a probability of the second service being requested to be executed after an execution of a first service is larger than a predefined sequence threshold value, and if an execution of the first service has been requested.

The method of clause 7 is performed according to any of the preceding clauses 1 through 6 and wherein the result of the speculative execution of the service is invalidated after a service-specific time period.

The method of clause 8 is performed according to any of the preceding clauses 1 through 7 and comprises:
- maintaining a speculative execution flag starting with a registration of a service with the request proxy, wherein the speculative execution flag is indicative of an ability of the service to be executed in a speculative manner.

The method of clause 9 is performed according to any of the preceding clauses 1 through 8 and comprises:
- determining a load metric value of a host system executing services registered at the request proxy, and
- dynamically adapting the dynamically changing score value dependent on the determined load metric value.

The method of clause 10 is performed according to any of the preceding clauses 1 through 9 and comprises:
- determining a first average execution time for all state providers related to an execution of a first service,
- determining a second average execution time for those state providers which are enabled for a speculative execution and which are related to an execution of the first service, and
- determining a ratio between the first and the second average execution time, and using the ratio for adapting the dynamically changing score value.

A system of clause 11 for speculative execution of a service in a distributed environment comprises:
- a processor and a memory operatively coupled to the processor, wherein the memory stored program code portions, which, when executed, enable the processor to:
- perform a speculative execution of a service and storing a related result, wherein a decision whether the speculative execution of the service is performed is dependent on a dynamically changing score value,
- receive a request for an execution of the service at a request proxy,
- upon determining that a valid result of the execution of the service is available from an earlier speculative execution of a comparable service,
- return the valid result by the request proxy, and
- upon determining that a valid result of the execution of the service is not available from an earlier speculative execution of a comparable service,
- executing the service in a non-speculative manner, and returning a received non-speculative result by the request proxy.

The system of clause 12 is performed according to clause 11 and wherein the processor, during the determination of the dynamically changing score value, is also enabled to
- determine a value at least selected out of the group comprising: (a) a risk factor value, (b) a probability value of a performance gain, (c) a performance gain percentage value, and (d) a computational effort value required for the execution of the service.

The system of clause 13 is performed according to clause 11 or 12 and wherein the processor is also enabled to execute the service in a speculative execution manner if the dynamically changing score value is larger than a configurable threshold value.

The system of clause 14 is performed according to any of the clauses 11 to 13 and wherein the speculative execution of a service is asynchronous to any non-speculative execution of the service.

The system of clause 15 is performed according to any of the clauses 11 to 14 and wherein the processor, during the determination that a valid result of the execution of the service is available from an earlier speculative execution, is enabled to use a service execution history, service context data of the earlier speculative execution of the service, service context data of the service requested for execution and/or a specification of service input data and service output data.

The system of clause 16 is performed according to clause 15 and wherein the processor is also enabled to:
- determine sequences of subsequent service executions from the service execution history, and
- increase the dynamically changing score value for a second service if a probability of the second service being requested to be executed after an execution of a first service is larger than a predefined sequence threshold value, and if an execution of the first service has been requested.

The system of clause 17 is performed according to any of the clauses 11 through 16 and wherein the result of the speculative execution of the service is invalidated after a service-specific time period.

The system of clause 18 is performed according to any of the clauses 11 to 17 and wherein the processor is also enabled to maintain a speculative execution flag starting with a registration of a service with the request proxy, wherein the speculative execution flag is indicative of an ability of the service to be executed in a speculative manner.

The system of clause 19 is performed according to any of the clauses 11 to 18 and wherein the processor is also enabled to:
- determine a load metric value of a host system executing services registered at the request proxy, and
- dynamically adapt the dynamically changing score value dependent on the determined load metric value.

A computer program product of clause 20 for speculative execution of a service in a distributed environment comprises a computer readable storage medium having program instructions embodied therewith. The program instructions are executable by one or more computing systems or controllers to cause the one or more computing systems to:
- perform a speculative execution of a service and storing a related result, wherein a decision whether the speculative execution of the service is performed is dependent on a dynamically changing score value,
- receive a request for an execution of the service at a request proxy, upon determining that a valid result of the execution of the service is available from an earlier speculative execution of a comparable service,
return the valid result by the request proxy, and
upon determining that a valid result of the execution of the service is not available from an earlier speculative execution of a comparable service,
executing the service in a non-speculative manner, and
returning a received non-speculative result by the request proxy.

What is claimed is:

1. A computer-implemented method for execution of a service in a distributed environment, the method comprising:
performing a speculative execution of a service and storing a related result, wherein a decision whether the speculative execution of the service is performed is dependent on a dynamically changing score value;
receiving a request for an execution of the service at a request proxy; and
upon determining that a valid result of the execution of the service is available from an earlier speculative execution of a comparable service; and
returning the valid result by the request proxy.

2. The method according to claim 1, wherein the dynamically changing score value is determined by:
determining a value selected from the group comprising:
a) a risk factor value,
b) a probability value of a performance gain,
c) a performance gain percentage value, and
d) a computational effort value required for the execution of the service.

3. The method according to claim 1, further comprising:
executing the service in a speculative execution manner if the dynamically changing score value is larger than a configurable threshold value.

4. The method according to claim 1, wherein the speculative execution of a service is asynchronous to any non-speculative execution of the service.

5. The method according to claim 1, wherein said determination that a valid result of the execution of the service is available from an earlier speculative execution is using a service execution history, service context data of the earlier speculative execution of the service, service context data of the service requested for execution and/or a specification of service input data and service output data.

6. The method according to claim 5, further comprising:
determining sequences of subsequent service executions from the service execution history; and
increasing the dynamically changing score value for a second service if a probability of the second service being requested to be executed after an execution of a first service is larger than a predefined sequence threshold value, and if an execution of the first service has been requested.

7. The method according to claim 1, wherein the result of the speculative execution of the service is invalidated after a service-specific time period.

8. The method according to claim 1, further comprising:
maintaining a speculative execution flag starting with a registration of a service with the request proxy, wherein the speculative execution flag is indicative of an ability of the service to be executed in a speculative manner.

9. The method according to claim 1, further comprising:
determining a load metric value of a host system executing services registered at the request proxy; and
dynamically adapting said dynamically changing score value dependent on the determined load metric value.

10. The method according to claim 1, further comprising:
determining a first average execution time for all state providers related to an execution of a first service;
determining a second average execution time for those state providers which are enabled for a speculative execution and which are related to an execution of the first service; and
determining a ratio between the first and the second average execution time and using the ratio for adapting the dynamically changing score value.

11. A system for speculative execution of a service in a distributed environment, the system comprising:
a processor; and
a memory operatively coupled to the processor;
wherein the memory stored program code portions, which, when executed enable the processor to:
perform a speculative execution of a service and storing a related result, wherein a decision whether the speculative execution of the service is performed is dependent on a dynamically changing score value;
receive a request for an execution of the service at a request proxy;
upon determining that a valid result of said execution of the service is available from an earlier speculative execution of a comparable service; and
return the valid result by the request proxy.

12. The system of claim 11, wherein the processor, during the determination of the dynamically changing score value, is further enabled to:
determine a value selected from the group comprising:
a) a risk factor value,
b) a probability value of a performance gain,
c) a performance gain percentage value, and
d) a computational effort value required for the execution of said service.

13. The system of claim 11, wherein the processor is further enabled to:
execute the service in a speculative execution manner if the dynamically changing score value is larger than a configurable threshold value.

14. The system according to claim 11, wherein the speculative execution of a service is asynchronous to any non-speculative execution of the service.

15. The system according to claim 11, wherein said processor, during the determination that a valid result of the execution of the service is available from an earlier speculative execution, is enabled to:
use a service execution history, service context data of the earlier speculative execution of the service, service context data of the service requested for execution and/or a specification of service input data and service output data.

16. The system according to claim 15, wherein the processor is also enabled to:
determine sequences of subsequent service executions from the service execution history, and
increase the dynamically changing score value for a second service if a probability of the second service being requested to be executed after an execution of a first service is larger than a predefined sequence threshold value, and if an execution of the first service has been requested.

17. The system according to claim 11, wherein the result of the speculative execution of the service is invalidated after a service-specific time period.

18. The system according to claim 11, wherein the processor is further enabled to:
  maintain a speculative execution flag starting with a registration of a service with the request proxy, wherein the speculative execution flag is indicative of an ability of the service to be executed in a speculative manner.

19. The system according to claim 11, wherein the processor is also enabled to:
  determine a load metric value of a host system executing services registered at the request proxy; and
  dynamically adapt the dynamically changing score value dependent on the determined load metric value.

20. A computer program product for speculative execution of a service in a distributed environment, the computer program product comprising:
  a computer readable storage medium having program instructions embodied therewith, the program instructions being executable by one or more computing systems or controllers to cause the one or more computing systems to:
    perform a speculative execution of a service and storing a related result, wherein a decision whether the speculative execution of the service is performed is dependent on a dynamically changing score value;
    receive a request for an execution of the service at a request proxy;
    upon determining that a valid result of the execution of the service is available from an earlier speculative execution of a comparable service; and
    return the valid result by the request proxy.

* * * * *